US010713713B2

(12) United States Patent
Mano et al.

(10) Patent No.: US 10,713,713 B2
(45) Date of Patent: Jul. 14, 2020

(54) INFORMATION BROKERING SYSTEM

(71) Applicant: EverySense, Inc., San Jose, CA (US)

(72) Inventors: Hiroshi Mano, San Jose, CA (US); Shojiro Morishita, San Jose, CA (US)

(73) Assignee: EVERYSENSE, INC., San Jose ( * ) Notice: Subject to any disclaimer, the term of this patent is extended or adjusted under 35 U.S.C. 154(b) by 855 days.

(21) Appl. No.: 15/111,090

(22) PCT Filed: Jul. 15, 2015

(86) PCT No.: PCT/JP2015/070273
§ 371 (c)(1),
(2) Date: Jul. 12, 2016

(87) PCT Pub. No.: WO2016/039012
PCT Pub. Date: Mar. 17, 2016

(65) Prior Publication Data
US 2016/0328793 A1    Nov. 10, 2016

(30) Foreign Application Priority Data
Sep. 12, 2014  (JP) .................................. 2014-186930

(51) Int. Cl.
*G06Q 40/00* (2012.01)
*G06Q 40/02* (2012.01)
(Continued)

(52) U.S. Cl.
CPC ............. *G06Q 40/02* (2013.01); *G06Q 30/06* (2013.01); *G06Q 50/10* (2013.01); *H04L 67/10* (2013.01);
(Continued)

(58) Field of Classification Search
CPC ....................................................... G06Q 40/00
(Continued)

(56) References Cited

U.S. PATENT DOCUMENTS 5,297,031 A  *  3/1994  Gutterman ............. G06Q 40/04
                                                           705/37
5,915,245 A  *  6/1999  Patterson, Jr. ......... G06Q 20/32
                                                           340/4.5
(Continued)

FOREIGN PATENT DOCUMENTS

CN          1322447 C        6/2007
CN       103455592 A       12/2013
(Continued)

OTHER PUBLICATIONS

Oct. 20, 2015 International Search Report issued in International Patent Application No. PCT/JP2015/070273.
(Continued)

*Primary Examiner* — Kirsten S Apple
(74) *Attorney, Agent, or Firm* — Oliff PLC

(57) ABSTRACT

An information brokering system according to an embodiment of the present invention is an information brokering system including a server that generates request-side data based on provision-side data received from a provision-side device, and provides the request-side data to a request-side device, the server evaluating a provision-side user having the provision-side device that generated the provision-side data which was a source of the request-side data, based on an amount of the request-side data provided to the request-side device, and the server calculating an amount of the request-side data receivable by a request-side user having the request-side device, based on the evaluation at a time when that request-side user was the provision-side user.

7 Claims, 10 Drawing Sheets

(51) Int. Cl.
*G06Q 30/06* (2012.01)
*G06Q 50/10* (2012.01)
*H04W 4/80* (2018.01)
*H04L 29/08* (2006.01)
*H04L 29/06* (2006.01)

(52) U.S. Cl.
CPC .............. *H04L 67/12* (2013.01); *H04L 67/42* (2013.01); *H04W 4/80* (2018.02)

(58) Field of Classification Search
USPC .......................................................... 705/35
See application file for complete search history.

(56) References Cited

U.S. PATENT DOCUMENTS

| | | | | |
|---|---|---|---|---|
| 6,161,099 | A * | 12/2000 | Harrington | G06Q 30/08 705/36 R |
| 6,199,050 | B1 * | 3/2001 | Alaia | G06Q 30/0601 705/1.1 |
| 6,321,212 | B1 * | 11/2001 | Lange | G06Q 40/00 705/35 |
| 6,345,090 | B1 * | 2/2002 | Walker | G06Q 10/02 379/114.03 |
| 6,421,653 | B1 * | 7/2002 | May | G06Q 30/08 705/36 R |
| 6,493,683 | B1 * | 12/2002 | David | G06Q 20/02 705/37 |
| H2064 | H * | 5/2003 | Buchalter | 705/37 |
| 6,629,081 | B1 * | 9/2003 | Cornelius | G06Q 20/04 705/30 |
| 6,659,861 | B1 * | 12/2003 | Faris | A63F 13/12 463/1 |
| 6,732,161 | B1 * | 5/2004 | Hess | G06Q 30/06 709/219 |
| 6,768,981 | B2 * | 7/2004 | Patterson, Jr. | G06Q 40/00 705/35 |
| 6,892,186 | B1 * | 5/2005 | Preist | G06Q 30/08 705/26.3 |
| 6,952,682 | B1 * | 10/2005 | Wellman | G06Q 30/08 705/1.1 |
| 7,249,075 | B1 * | 7/2007 | Altomare | G06Q 40/00 705/35 |
| 8,001,035 | B2 * | 8/2011 | Kwan | G06Q 30/08 705/35 |
| 2008/0306865 | A1 * | 12/2008 | Evelyn | G06Q 30/08 705/37 |

FOREIGN PATENT DOCUMENTS

| | | |
|---|---|---|
| JP | 2003-132160 A | 5/2003 |
| JP | 2003-284139 A | 10/2003 |
| JP | 2006-031723 A | 2/2006 |
| JP | 2007-243478 A | 9/2007 |
| JP | 2011-028325 A | 2/2011 |
| JP | 2013-162258 A | 8/2013 |

OTHER PUBLICATIONS

Mar. 24, 2020 Office Action issued in Chinese Patent Application No. 201580048860.5.

* cited by examiner

FIG. 3

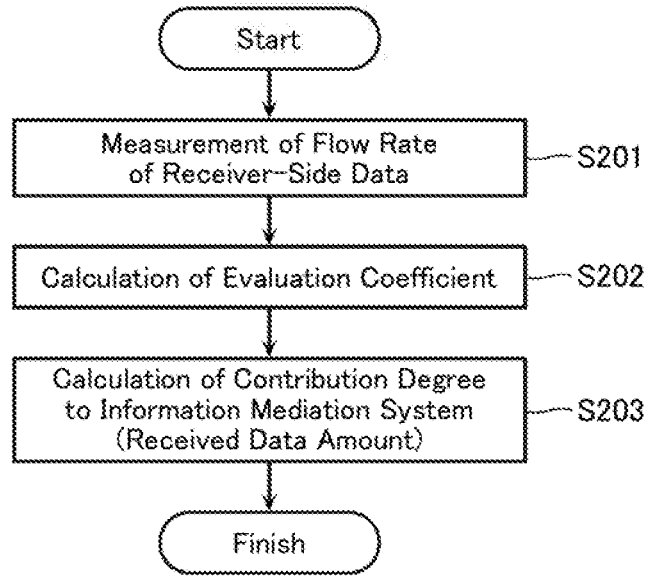

FIG. 4

| Evaluation Item | Evaluation Coefficient | | |
|---|---|---|---|
| Quality Level of Data | High: 2 | Medium: 1 | Low: 0.5 |
| Disclosure Level of Personal Information | High: 2 | Medium: 1 | Low: 0.5 |
| Level of Abstraction of Data | High: 2 | Medium: 1 | Low: 0.5 |
| Type of Registered Device | Designated Maker Produced: 2 | Authenticated: 1.2 | Unauthenticated: 1 |
| Level of Number of Registered Devices of Individual | High: 2 | Medium: 1 | Low: 0.5 |
| Evaluation Coefficient at Time of Organization Registration | High: 2 | Medium: 1 | Low: 0.5 |
| Level of Data Storage Period of Sender | High: 2 | Medium: 1 | Low: 1 |

FIG. 5

| | Provision Condition Setting Screen (1) | |
|---|---|---|
| Name | ● Disclosed  ○ Undisclosed | |
| Age | ● Disclosed  ○ Decade Only  ○ Undisclosed | |
| Sex | ● Disclosed  ○ Undisclosed | |
| Address | ● Disclosed<br>○ Country Only<br>○ To State (County) Level<br>⋮<br>○ Undisclosed | |
| Position Display Prohibit Region 1 | 1) X State, X City, X Town, X House Number   2) Within X km | |
| Position Display Method | ● Obscuring  ○ Generalizing  ○ Undisclosed | |
| Occupation | ● Disclosed<br>○ Broad Classification Only<br>○ Medium Classification Only<br>⋮<br>○ Undisclosed | |
| | | Next  ─ W101 |

FIG. 6

| Provision Condition Setting Screen (2) | | |
|---|---|---|
| Sensor Type | Geiger Counter | ~W201 |
| Simple Description of Sensor | XX Company Produced, Model Number xx | |
| Data Providable Period | August 1, 2014 to December 31, 2016 | |
| Data Storage Period | May 1, 2010 to July 31, 2014 | |
| Data Acquisition Interval | 10 minutes | |
| Device Registration Number | ES-GA-Y0090 | ~W202 |
| Positional Information Disclosure Condition 1 | Position A: Level 1 (Coordinate Level) | ~W203 |
| Positional Information Disclosure Condition 2 | Position B: ○○ Town, ○○ House Number, Radius △ km, Undisplayed | |
| Positional Information Disclosure Condition 3 | Position C: △ Town, △ House Number, Radius △ km, Undisplayed | |
| Positional Information Disclosure Condition 4 | Time A: 20:00 PM to 7:00 AM, Undisplayed | |
| Positional Information Disclosure Condition 5 | Time B: 20:00 PM to 7:00 AM, Undisplayed | |
| Information Disclosure Condition 1 | Disclosure Level 3 | ~W204 |
| Selling Price Condition 1 | 100 Points/Day Or More | ~W205 |
| Selling Price Condition 2 | 2500 Points/Month Or More | |
| | Register | ~W206 |

FIG. 10

| | |
|---|---|
| Request Condition (Recipe) Setting Screen | |
| Recipe Name | Movement Path Collection Recipe 001 |
| Simple Description of Recipe | Leading of Teenage Females in Shibuya, Tokyo, in August 2014 |
| Application Period | August 1, 2014 to August 31, 2014 |
| Data Acquisition Period | September 1, 2014 to December 31, 2014 |
| Data Acquisition Time | 9:00 AM to 21:00 PM   Japanese Time |
| Data Acquisition Interval | 2 minutes |
| Information Disclosure Condition 1 | Name: Undisclosed |
| Information Disclosure Condition 2 | Sex: Female |
| Information Disclosure Condition 3 | Position A: Level 1   Coordinate Level |
| Information Disclosure Condition 4 | Position B: ○○ Town, ○○ House Number, Radius 2 km, Undisplayed |
| Information Disclosure Condition 5 | Position C: ○○ Town, ○○ House Number, Radius 2 km, Undisplayed |
| Information Disclosure Condition n | Position: Level 1   Coordinate Level |
| Sensor Condition 1 | GPS |
| Sensor Condition 2 | Acceleration |

Continue to Next Page ~W601

FIG. 11

| | |
|---|---|
| Recipe Name | Movement Path Collection Recipe 001 |
| Buying Price Condition 1 | 100 Points/Day Or More |
| Buying Price Condition 2 | 2500 Points/Month Or More |
| Number of Sensors Recruited | 500 |

Register —W701

FIG. 12

```
Notification
2014.04.30 "Farm owner"    Request "xxx" has been canceled.
2014.05.02 "Farm owner"    There are 12 newly-arrived requests.
2014.05.02 "Farm owner"    Data acquisition period of request "xxx" has finished.
2014.05.02 "Farm owner"    Failed in data transmission of request
                           "Daily Movement Distance 2".
2014.05.03 "Restaurant owner"  A new request condition has been       ~W801
                           registered by a receiver member.

>>more
```

INFORMATION BROKERING SYSTEM

TECHNICAL FIELD

The present invention relates to an information brokering system.

BACKGROUND ART

Numerous sensor devices such as a pedometer or GPS receiver have existed from the past, and due to the influence of miniaturization and cost reduction in recent years, even an individual has become able to casually utilize these sensor devices.

Furthermore, due to the spread of the internet or communication devices such as mobile phones, smart phones, and so on, of recent years, utilization methods of measurement data by these sensor devices have become highly-diversified. For example, with a body weight/body composition meter and a smart phone, simply by sending the measurement data to the smart phone via the likes of Wi-Fi (registered trademark), an application in the smart phone automatically analyzes the measurement data and manages daily body weight/body composition. Moreover, depending on a vendor of the sensor device, there are also places providing a cloud service where measurement data of a user can be accumulated.

However, it is often the case that this measurement data, excluding the case of being personally utilized by the user, is substantively automatically collected and utilized by a specific corporation, organization, and so on, such as a maker of the sensor device. However, in such a situation, not only could it not be said that the measurement data is being utilized according to a positive will of the user who could be said to be a generation source of that measurement data, but the place to which the measurement data is provided is limited, hence it is difficult to say that the measurement data is being sufficiently effectively utilized.

In this regard, if it is possible to construct an information brokering system that provides the measurement data from the user to another person, the user can provide the measurement data to numerous other persons according to the user's own positive will. Moreover, it is effective also for the other person receiving provision of the measurement data, in being able to collect numerous measurement data from a wide range of users.

However, simply by there being an information brokering system, the user who is the provider will not think of positively utilizing the measurement data if there is no merit in providing the measurement data. Moreover, if reliability of the measurement data brokered is low, then it becomes difficult to utilize for the other person receiving provision of the measurement data.

CITATION LIST

Patent Literature

PLT 1: JP 2003-132160 A

SUMMARY OF INVENTION

Technical Problem

The present invention is made in view of the above, and an object thereof is to provide an information brokering system that provides more numerous data to a provider of useful data.

Solution to Problem

An information brokering system according to an embodiment of the present invention is an information brokering system including a server that generates request-side data based on provision-side data received from a provision-side device, and provides the request-side data to a request-side device, the server evaluating a provision-side user having the provision-side device that generated the provision-side data which was a source of the request-side data, based on an amount of the request-side data provided to the request-side device, and the server calculating an amount of the request-side data receivable by a request-side user having the request-side device, based on the evaluation at a time when that request-side user was the provision-side user.

Advantageous Effects of Invention

The present invention makes it possible to provide an information brokering system that provides more numerous data to a provider of useful data.

BRIEF DESCRIPTION OF DRAWINGS

FIG. 3 is a flow of calculation of received amount of data in the information brokering system according to the present embodiment.

FIG. 4 is an example of a table showing an evaluation coefficient calculation standard in the information brokering system according to the present embodiment.

FIG. 5 is a view showing an example of a provision condition setting screen displayed in a sender-side device in the information brokering system according to the present embodiment.

FIG. 6 is a view showing an example of a provision condition setting screen displayed in a sender-side device in the information brokering system according to the present embodiment.

FIG. 10 is a view showing an example of a request condition setting screen displayed in a receiver-side device in the information brokering system according to the present embodiment.

FIG. 11 is a view showing an example of a request condition setting screen displayed in a receiver-side device in the information brokering system according to the present embodiment.

FIG. 12 is a view showing an example of a notification screen displayed in a sender-side device in the information brokering system according to the present embodiment.

DESCRIPTION OF EMBODIMENTS

[Outline of Information Brokering System]

First, an outline of an information brokering system according to an embodiment of the present invention will be described.

Figure 1:
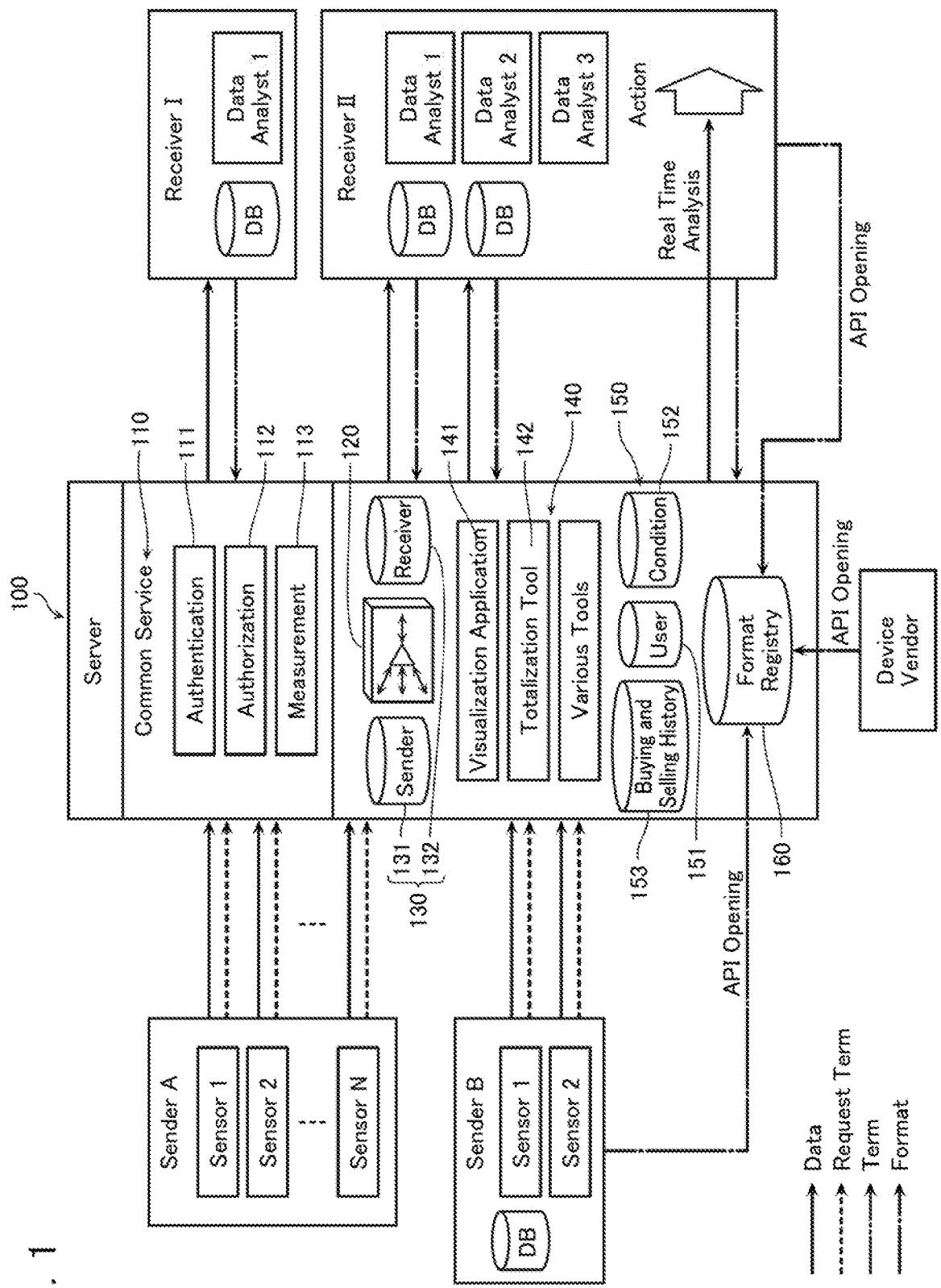
FIG. 1 is a view showing an outline of an information brokering system according to an embodiment of the present invention.

FIG. 1 is a view showing the outline of the information brokering system according to the present embodiment.

The information brokering system according to the present embodiment comprises a server 100, and is a system in which the likes of measurement data due to a sensor device had by a certain user is converted to data of a format requested by another user, and then provided to that other user, via this server 100.

Hereafter, a user that sends data to the server 100 will sometimes also be called a "sender", data sent to the server 100 from a sender side will sometimes also be called "sender-side data" (provision-side data), a user that receives provision of data from the server 100 will sometimes also be called a "receiver", and data provided to a receiver side from the server 100 will sometimes also be called "receiver-side data" (request-side data). In addition, raw data or near-raw data outputted by the sensor device will sometimes also be called "first data", and data generated in a format requested by the receiver based on the first data will sometimes also be called "second data".

The server 100 provides to the receiver side second data generated based on first data had by the sender. Usually, the server 100 receives first data as sender-side data from the sender, generates second data based on this first data inside the server 100, and provides this second data to the receiver side as receiver-side data. However, there are also cases where the sender does not want to send first data unchanged to the server 100. In this case, it is also possible to generate second data based on first data on the sender side, and then send this second data to the server 100 as sender-side data. In this case, the server 100 provides the sender-side data unchanged to the receiver side as receiver-side data.

Note that hereafter, the present embodiment will be described assuming measurement data of various kinds of sensor devices as first data. However, it should be noted that the present embodiment may be applied also in the case of other data.

The server 100 includes a common service processing unit 110, a switch circuit 120, a data buffer group 130, a tool group 140, a data base group 150, and a format registry 160.

The common service processing unit 110 includes the following for each user, namely: an authentication service processing unit 111 that confirms a user accessing the server 100; an authorization service processing unit 112 that performs control of access authority for each authenticated user; and a measurement service processing unit 113 that notifies an amount of sender-side data sent by a sender or receiver-side data received by a receiver.

The switch circuit 120 performs matching of a provision condition presented from the sender side and a request condition (hereafter, sometimes also called "recipe") presented from the receiver side, and in the case that the conditions have matched, converts sender-side data sent from the sender side to generate receiver-side data, or adopts sender-side data unchanged as receiver-side data, and supplies this receiver-side data to the receiver side. Data flow at this time and the provision condition and request condition will be mentioned in detail later.

The data buffer group 130 is a group of a sender-side buffer 131 and a receiver-side buffer 132. The sender-side buffer 131 temporarily stores sender-side data that has been sent. The receiver-side buffer 132 temporarily stores receiver-side data that is to be supplied. The sender-side buffer 131 and the receiver-side buffer 132 are prepared for each user, and their capacities increase or decrease according to the likes of a user's contribution degree to the information brokering system which will be mentioned later.

The tool group 140 is a group of tools useful in utilization and management of data provided to the user. For example, there are a visualization application 141 that expresses data graphically and makes the data easy to see, a totalization tool 142 that totals data, and so on. Moreover, this tool group 140 may include not only a tool prepared by a server 100 side, but also a tool created by the user to be registered in the server 100. If a tool-related API (Application Programming Interface) is prepared on the server 100 side, the user can easily create a tool having a desired function.

The data base group 150 includes a user information data base 151, a provision/request condition data base 152, and a data buying and selling history data base 153. Registered in the user information data base 151 is personal information of the user such as a name and age of the user, sensor device had by the user, and so on. Registered in the provision/request condition data base 152 are the provision condition presented from the sender, or the request condition presented from the receiver. Registered in the data buying and selling history data base 153 is a history of data transactions of each user.

The format registry 160 records data structure information of sender-side data. For example, in the case that sender-side data is measurement data outputted from a sensor device, the data structure is registered based on content disclosed by a vendor of this sensor device, and so on. Similarly, for example, in the case that sender-side data is data of a different format generated based on measurement data of the sensor device, the data structure is registered based on content disclosed by the sender that generated that data, and so on. Moreover, an API related to data structure information is registered based on the likes of content disclosed by the vendor of the sensor device, the sender, or the receiver.

This server 100 assumes the following utilization by a user.

In other words, the server 100 assumes, as a sender, a user having: a sensor device; and a communication device such as a smart phone that sends measurement data of the sensor device to the server 100 via the likes of Wi-Fi (registered trademark). The number of sensor devices had by the user may be one or a plurality. Moreover, when sending numerous measurement data sequentially by the likes of batch processing, the sender may have a data base where the measurement data is accumulated. Note that in the case that the sensor device itself has a communication function, the sender need not have a communication device. Moreover, a device group had by the sender, such as the above-described sensor device, communication device, and data base, and an operation terminal such as a personal computer or smart phone controlling these or including these, is included in a sender-side device (provision-side device).

On the other hand, the server 100 assumes, as a receiver, a user having: a data base for temporarily accumulating receiver-side data; and a communication device that receives a receiver-side data from the server 100. On the receiver side, receiver-side data that has undergone the likes of batch processing can be analyzed by a data analyst to be reflected in corporation activities, and so on. Note that when receiver-side data provided from the server 100 is analyzed in real time, the receiver need not have a data base. Moreover, a device group had by the receiver, such as the above-described data base and communication device, and an operation terminal such as a personal computer controlling these or including these, is included in a receiver-side device (request-side device).

[Characteristic Functions of Server]

The server 100 has at least three characteristic functions, that is, a switch circuit control function, a privacy protection function, and a data obtaining right protection function. Those characteristic functions of the server 100 will be described herein.

First, the switch circuit control function will be described.

The switch circuit control function is a function that controls data flow from the sender to the receiver. Specifically, it controls the switch circuit 120 by a matching result of the provision condition and the request condition.

Figure 2:
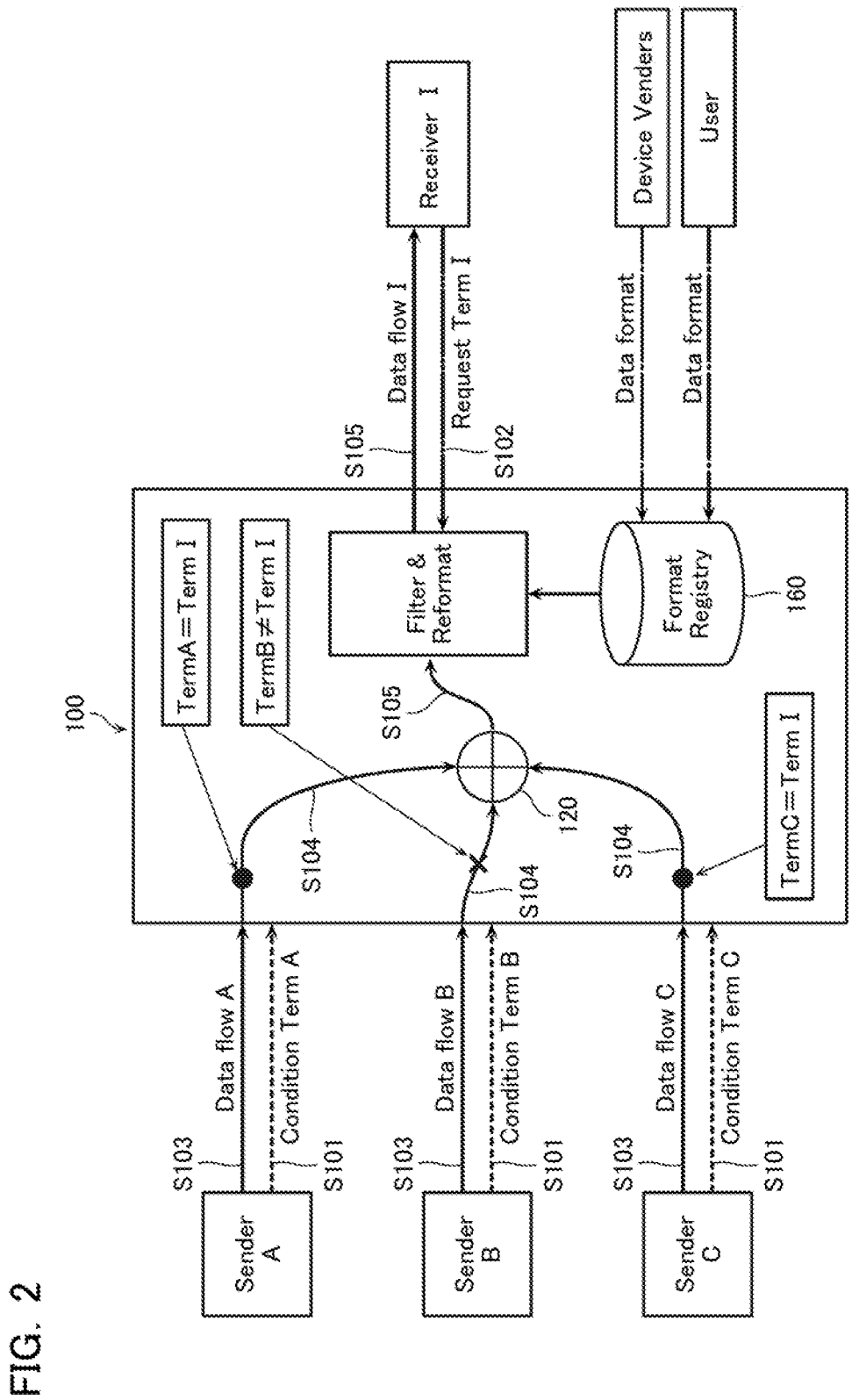
FIG. 2 is a view explaining data flow and a switch circuit control function in the information brokering system according to the present embodiment.

FIG. 2 is a view explaining data flow and the switch circuit control function in the information brokering system according to the present embodiment.

First, in step S101, the sender presents one or more provision conditions for each sensor device, to the server 100, and in step S102, the receiver presents one or more request conditions to the server 100. The provision/request conditions presented from the user are registered in the provision/request condition data base 152. Note that specific examples of the provision/request conditions will be mentioned in detail later.

Next, in step S103, the sender sends sender-side data to the server 100. Now, as previously mentioned, sender-side data is sometimes first data and is sometimes second data. First data is configured by: data indicating an actual measurement value, or a measurement value processed inside the sender-side device (hereafter, sometimes also called "real data"); and data including a unique ID enabling identification of a meaning indicated by the first data by checking against registration information of the format registry 160, and data structure information of the first data (hereafter, sometimes also called "additional data"). On the other hand, second data is data of a format presented in the request condition by the receiver. The server 100, upon receiving the sender-side data, once holds this data in the sender-side buffer 131.

Next, in step S104, the server 100 accesses the provision/request condition data base 152 to perform matching of the provision condition and the request condition registered therein. In the case that the provision condition and request condition have matched, processing is shifted to step S104. This flow from step S104 to step S105 corresponds to the switch circuit control function.

Finally, in step S105, sender-side data is selectively provided to the receiver that presented the request condition matching the provision condition. In this step S105, when the sender-side data is first data, the server 100 refers to the data structure information corresponding to each of the sensor devices from within the format registry 160, and having calculated the real data from the sender-side data, converts to and generates receiver-side data. Note that during this generation, data structure information of receiver-side data registered in the format registry 160 may be referred to. On the other hand, when the sender-side data is second data, the sender-side data is adopted unchanged as receiver-side data. Moreover, the receiver-side data is once held in the receiver-side buffer 132, and then when a communication line of the server 100 and receiver attains a ready state, is provided in a FIFO (First In First Out) format to the receiver. Note that as previously mentioned, the receiver-side data is second data, and is data of a format requested by the receiver. Therefore, for example, the receiver can also request second data of a format configured only by real data specifying the likes of a number of digits and a unit.

As previously mentioned, in the case of the present embodiment, the additional data of the measurement data is registered in the format registry 160. Therefore, the sender and the receiver can utilize a wide variety of sensor devices, without being aware of formats of measurement data differing for each of the sensor devices. In addition, when the sender sends sender-side data of a format configured only by real data, or when the receiver requests receiver-side data of a format configured only by real data, a communication load from the server 100 to the receiver side can be reduced. Furthermore, due to the above-described data flow, basically, the sender-side data and the receiver-side data are not saved for a long time in the server 100. Therefore, there is no need to provide a large data base in the server 100. Moreover, a risk of unauthorized utilization of data, and so on, can be reduced. Note that even in this case, the server 100 may provide the user with a storage region where data is saved for a long time, as an optional service.

Next, the privacy protection function will be described.

The privacy protection function is a function that generates metadata (receiver-side data) from raw data (sender-side data) outputted from various kinds of sensor devices, with an object of protecting personal information and preventing crime. This privacy protection function is configured from at least one of the following sub-functions, namely, an obscuring function, a generalizing function, and a masking function. These three sub-functions will be described below.

First, the obscuring function will be described.

The obscuring function is a function where the sender can select a precision of obscuring the raw data (sender-side data). This obscuring function employs a method causing random numbers to act on the raw data. For example, positional information such as longitude, latitude, elevation, distance from a Wi-Fi wireless station, and so on, outputted from a GPS receiver are obscured with a precision of ±50 m, ±100 m, or ±200 m.

Next, the generalizing function will be described.

The generalizing function is a function that generates metadata (receiver-side data) abstracted from raw data (sender-side data), to be provided to the receiver. For example, when the raw data is positional information, a nearest station thereto is generated as the metadata, and when the raw data is a time, any of morning, daytime, and evening is generated as the metadata. Alternatively, when the raw data is body weight, expressions such as heavy, light, 50 kg class, and so on, are generated as the metadata.

Finally, the masking function will be described.

The masking function is a function that controls authorization/stoppage of provision of receiver-side data to the receiver, according to whether the likes of a position of the sensor device and a measurement time indicated by the first data or second data match a masking condition presented from the sender, or not. For example, the masking function stops provision of receiver-side data when the sensor device has entered within a 500 m or 1 km range from a company or home, or authorizes provision of receiver-side data only between 09:00 and 21:00. In addition, it is also possible that, when the receiver wants to confirm the number of times of convenience store use in a one week period of the sender, the positional information is provided in a form concealing a route to go to the convenience store, by selection of the sender.

By using the above three sub-functions, privacy of the sender can be protected. Moreover, since the receiver can receive metadata, conversion of the measurement data to a look-up table is easy, and time of computational processing, and so on, can be reduced.

Note that if an application having an operable privacy protection function is prepared in the likes of the personal computer or smart phone of the sender-side device, the sender can utilize the privacy protection function in the sender-side device without relying on the server 100.

Next, the data obtaining right protection function will be described.

The data obtaining right protection function is a function that gives to a sender that sends numerous sender-side data of high quality and high demand, a right to receive receiver-side data from another person free or at low cost.

In this data obtaining right protection function, an amount of receiver-side data received by a user is determined by the contribution degree to the information brokering system of sender-side data sent by that user. The amount of receiver-side data received depends on a capacity of the receiver-side buffer 132, but this capacity increases or decreases according to the contribution degree to the information brokering system. Note that the capacity of the receiver-side buffer 132 may be increased by the likes of fee charging of the user, regardless of contribution degree to the information brokering system.

FIG. 3 is a calculation flow of contribution degree to the information brokering system in the information brokering system according to the present embodiment. In addition, FIG. 4 is a table used in the flow of FIG. 3, and is an example of a table showing an evaluation coefficient calculation standard.

First, in step S201, a flow rate of the receiver-side data (matching data) provided on matching of the provision condition and request condition, is measured. In the server 100, the sender-side data outputted from the one or more sensor devices registered by the sender is once held in the sender-side buffer 131 prepared for each user, and after being converted to receiver-side data, is once held in the receiver-side buffer 132. Therefore, the capacity of the receiver-side buffer 132 increases or decreases according to the number of sensor devices registered or the number of receivers. Subsequently, the receiver-side data held in the receiver-side buffer 132 is supplied, in a FIFO format, sequentially from a receiver for which communication between the server 100 and the receiver has been authorized. Then, in this step S201, an amount of receiver-side data provided to the receiver is calculated and stored in the data buying and selling history data base 153 of the server 100.

Next, in step S202, an evaluation coefficient employed in calculation of contribution degree to the information brokering system, is calculated.

The evaluation coefficient is determined from several evaluation items registered beforehand in the server 100, such as a level of quality of data evaluated from a recipient, a level of disclosure of personal information, and so on. Each of the evaluation items is assigned with a numerical value of 0 to 2 as shown in FIG. 4, for example, according to that level. Then, the evaluation coefficient is calculated by multiplying each of these evaluation items.

Note that it may be configured such that the amount of receiver-side data receivable by a user when they have become a receiver is limited to receiver-side data within the level of disclosure of personal information and level of abstraction of data set by this user as a sender.

Finally, in step S203, the contribution degree to the information brokering system is calculated. This contribution degree becomes, as it is, the capacity of receiver-side data able to be received when the user has become a receiver.

The contribution degree to the information brokering system of the sender is calculated by multiplying the amount of receiver-side data measured in step S201 by the evaluation coefficient of the receiver-side data calculated in step S202, for example. As previously mentioned, the capacity of the receiver-side buffer 132 increases or decreases, and the amount of receiver-side data receivable by the user is determined, by the contribution degree to the information brokering system.

In this way, the data obtaining right protection function makes it possible for the sender to achieve a merit of being able to receive numerous data from an another person, as a receiver, by providing data of high evaluation. Moreover, the receiver can also achieve a merit of being able to receive the data of high evaluation.

Note that the contribution degree to the information brokering system, besides being able to be employed by the data obtaining right protection function as previously mentioned, can be utilized also in matching of the provision and request conditions. For example, if the receiver adds to the request condition a standard of contribution degree to the information brokering system, it is possible to achieve a transaction of data only with a sender of high evaluation satisfying this standard.

[Registration Procedures of Provision/Request Conditions]

Next, an example of a registration procedure of the provision condition will be described.

Figure 7:
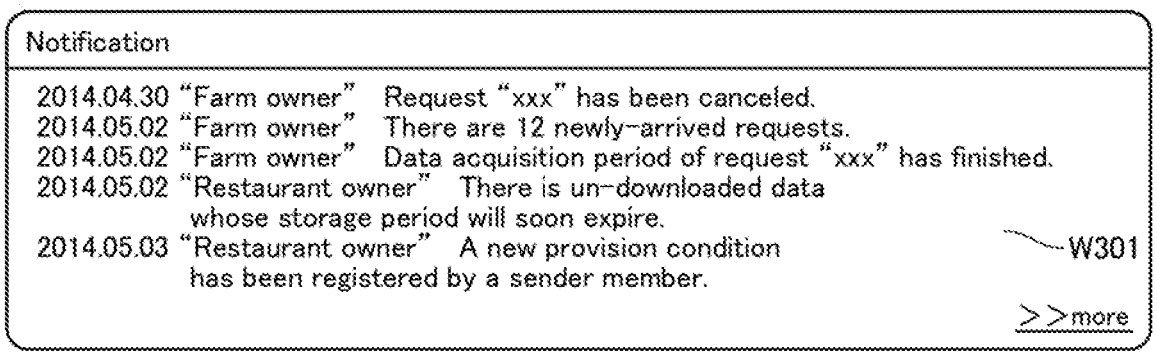
FIG. 7 is a view showing an example of a notification screen displayed in a receiver-side device in the information brokering system according to the present embodiment.

FIGS. 5 and 6 are views showing an example of a provision condition setting screen displayed in the sender-side device in the information brokering system according to the present embodiment. In addition, FIG. 7 is a view showing an example of a notification screen displayed in the receiver-side device in the information brokering system according to the present embodiment.

In order to register the provision condition, when the server 100 is accessed from the sender-side device, the server 100 causes the provision condition setting screen to be displayed in the sender-side device. When the operation terminal of the receiver-side device is a personal computer, the screens of FIGS. 5 and 6 are displayed on a display of this personal computer.

The provision condition setting screen may be divided into a plurality of screens according to the number of items of the provision condition. In the case of FIGS. 5 and 6, the provision condition setting screen is divided into two, that is, (1) and (2).

The provision condition setting screen (1) of FIG. 5 is a screen that sets a disclosed condition of registrant information of a user that will be a sender, such as a name, age, and sex of the sender. When a button W101 is clicked in this screen, the provision condition setting screen (2) of FIG. 6 is displayed.

The provision condition setting screen (2) of FIG. 6 is a screen that sets a disclosed condition of the sensor device and the sender-side data which is measurement data of that sensor device. For example, when a setting value is limited as in text box W201 that sets a classification of the sensor device, or when the same setting value was often inputted in the past as in text box W202 that sets a device registration number, it may be configured that the likes of a table is displayed whereby input can be performed by a selection format. Moreover, when setting content becomes complicated as in the text boxes W203 and W204 that set disclosed conditions, it may be configured that only a value of a level is set here, and that the content of that level is set separately. In addition, a text box W205 that sets a selling price condition may be configured capable of being specified by various kinds of currencies or cash-convertible points, and so on, of the selling price of the sender-side data.

Then, when a button W206 in a lower portion of the provision condition setting screen (2) is clicked after performing a required setting of the setting items shown in FIGS. 5 and 6, the provision condition is sent (presented) to the server 100 and registered in the provision condition/request condition data base 152 in the server 100. In addition, the server 100 that has received the registration notifies the receiver-side device that a new provision condition has been registered by another person. A gist of the registration is displayed on the notification screen in the receiver-side device that has received the notification, as shown in text W301 of FIG. 7.

Now, screen display in the case that the operation terminal of the sender-side device and the receiver-side device is a smart phone, will be mentioned.

Figure 8:
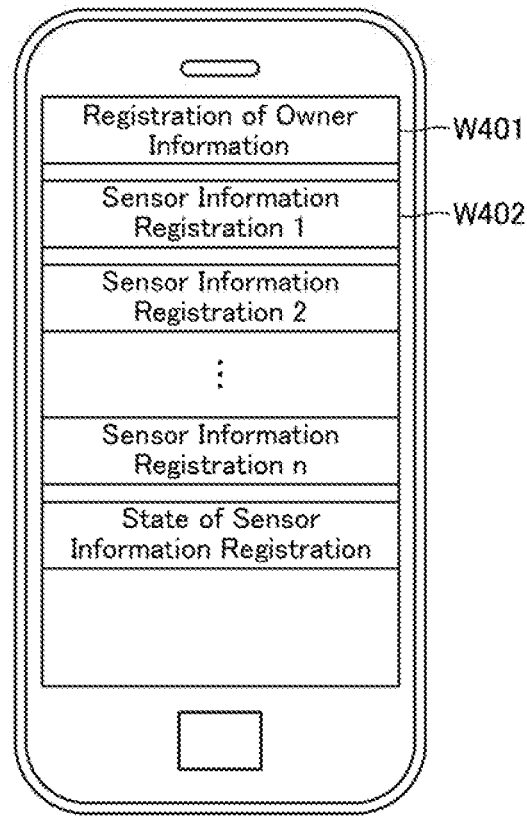
FIG. 8 is a view showing an example of a provision condition setting screen displayed in a sender-side device in the information brokering system according to the present embodiment.
Figure 9:
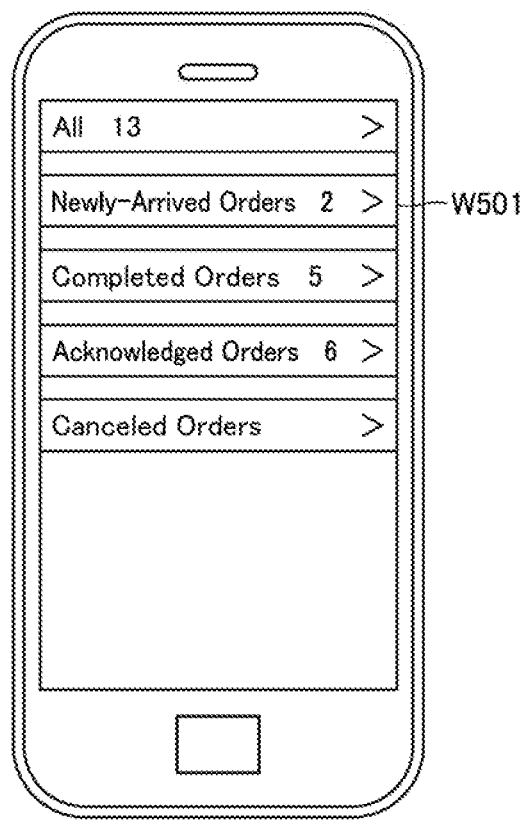
FIG. 9 is a view showing an example of a notification screen displayed in a receiver-side device in the information brokering system according to the present embodiment.

FIG. 8 is a view showing an example of the provision condition setting screen displayed in the sender-side device (smart phone) in the information brokering system according to the present embodiment. FIG. 9 is a view showing an example of the notification screen displayed in the receiver-side device (smart phone) in the information brokering system according to the present embodiment.

In the case of the smart phone, usually, a screen is smaller compared to in a personal computer. Therefore, for example, by preparing a menu screen of the kind shown in FIG. 8, setting is made easy. It is configured such that when a menu item W401 is clicked, a screen corresponding to the provision condition setting screen (1) of FIG. 5 is displayed, and it is configured such that when a menu item W402 is clicked, a screen corresponding to the provision condition setting screen (2) of FIG. 6 is displayed. Moreover, when a new provision condition is registered in the server 100, the server 100 push-notifies a gist of the registration to the smart phone of the receiver-side device. The smart phone that has received push-notification displays the number of cases in menu item W501, as shown in FIG. 9. The receiver that has confirmed this number of cases has increased can confirm the provision condition that has been registered, by clicking this menu item W501. The receiver that has received notification of registration of the provision condition, having examined that provision condition, can notify the sender via the server 100 to the effect of having a request intention of the measured data.

Next, an example of a registration procedure of the request condition (recipe) will be described.

FIGS. 10 and 11 are views showing an example of a request condition setting screen displayed in the receiver-side device in the information brokering system according to the present embodiment. In addition, FIG. 12 is a view showing an example of a notification screen displayed in the sender-side device in the information brokering system according to the present embodiment.

In the case of registering the request condition, when the server 100 is accessed from the receiver-side device, the server 100 causes the request condition setting screen to be displayed in the receiver-side device. When the operation terminal of the receiver-side device is a personal computer, the screens of FIGS. 10 and 11 are displayed on a display of this personal computer.

The request condition setting screen may be divided into a plurality of screens according to the number of items of the request condition. In the case of FIGS. 10 and 11, the request condition setting screen is divided into two, and the next request condition setting screen can be displayed by clicking a button W601 shown in a lower portion of FIG. 10. In addition, as shown in FIG. 11, there is a button W701 in a lower portion of a final request condition setting screen. Moreover, when this button W701 is clicked, the request condition is sent (presented) to the server 100 and registered in the provision condition/request condition data base 152 in the server 100. In addition, the server 100 that has received the registration notifies the sender-side device that a new request condition has been registered by another person. A gist of the registration is displayed on the notification screen in the sender-side device that has received the notification, as shown in text W801 of FIG. 12. The sender that has received notification of registration of the request condition, having examined that request condition, can notify the receiver via the server 100 to the effect of having a provision intention of the measured data.

That concludes the examples of registration procedures of the provision/request conditions in the present embodiment. In this way, due to the present embodiment, setting and registration of the condition by operation of a user terminal are possible, and when there has been a new registration, this is notified to the user terminal. As a result, the user can know a new registration of provision/request conditions without delay, and a rapid transaction of measurement data is enabled.

Note that not only may text be displayed on the screen as in texts W301 and W801, but also the same content may be sent as an email to the user terminal. In this case, the new registration of a condition can be more reliably notified to the user.

As described above, the information brokering system according to the present embodiment enables data generated by a user, such as measurement data of a sensor device, to be provided to numerous receivers by a positive will of the user. At that time, the user can undertake buying and selling of data under more advantageous conditions, by setting/referring to a selling price condition of the provision condition or setting/referring to a buying price condition of the request condition.

Moreover, as a result of the privacy protection function, not only is it possible to protect privacy of the sender which is threatened by a data transaction, but also the receiver can obtain data of a desired disclosure level, hence a reduction in processing time of data analysis, and so on, can be achieved.

Furthermore, the data obtaining right protection function, by giving to a user that provides numerous useful data, a right to be able to receive more numerous data, makes it possible to achieve an improvement in quality and amount of data circulating via the information brokering system.

[Others]

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

REFERENCE SIGNS LIST 100 server
110 common service processing unit
111 authentication service processing unit
112 authorization service processing unit
113 measurement service processing unit
120 switch circuit
130 data buffer group
131 sender-side buffer
132 receiver-side buffer
140 tool group
141 visualization application
142 totalization tool
150 data base group
151 user information data base
152 provision/request condition data base
153 data buying and selling history data base
160 format registry

The invention claimed is:

1. An information network system comprising:
a plurality of communication devices that respectively function as: (i) a provision-side device that provides provision-side data, and/or (ii) a request-side device that requests request-side data, and
a server communicating with the plurality of communication devices in which the provision-side device provides provision-side data to the server, and the request-side device requests request-side data from the server, the server having a request-side data buffer, the server being configured to:
calculate a contribution degree of a provision-side user that is obtained by multiplying an amount of the request-side data provided to the request-side device with a predetermined evaluation coefficient,
in response to calculating the contribution degree, automatically allocate an amount of the request-side data based on the calculated contribution degree, and
increase or decrease a capacity of the request-side data buffer based on the allocated amount of the request-side data.

2. The information network system according to claim 1, wherein the server is further configured to:
receive a request condition from the request-side device, the request condition including a standard of evaluation of the provision-side user, and
based on the received request condition, provide to the request-side device the request-side data generated based on provision-side data received from the provision-side device of the provision-side user having the evaluation satisfying the standard of the evaluation.

3. The information network system according to claim 2, wherein the server is further configured to:
provide the request condition sent from the request-side device to the provision-side device, and
provide a provision intention of the request-side data to the provision-side device with respect to the request condition sent from the provision-side device.

4. The information network system according to claim 1, wherein the server is further configured to:
in the case that there are a plurality of the provision-side devices, provide to the request-side device the request-side data generated based on provision-side data received from one or more of the provision-side devices selected in the request-side device from the plurality of provision-side devices.

5. The information network system according to claim 1, wherein
the provision-side data includes unmodified data from the provision-side device, or formatted data which is formatted in accordance with a storage standard of the provision-side data,
the server includes a format registry that stores data structure information of the provision-side data, and
when generating the request-side data based on the provision-side data, the server extracts the unmodified data from the provision-side data by referring to data structure information of the provision-side data stored in the format registry, and generates the request-side data based on the unmodified data.

6. The information network system according to claim 5, wherein the server is further configured to:
receive a request condition from the request-side device, wherein at least one of: (i) the format registry of the server, or (ii) the request condition, includes data structure information of the request-side data, and
when generating the request-side data based on the provision-side data, generate the request-side data based on the data structure information of the request-side data.

7. The information network system according to claim 5, wherein the request-side data does not have the additional data.

* * * * *